United States Patent [19]
Jeal et al.

[11] 3,878,760
[45] Apr. 22, 1975

[54] IMPROVED BLIND FASTENER

[75] Inventors: Harvey Philip Jeal, Stevenage; Raymond Dennis Lacey, Essendon; Frederick Arthur Summerlin, St. Albans, all of England

[73] Assignee: Aerpat A.G., Zug, Switzerland

[22] Filed: Mar. 5, 1973

[21] Appl. No.: 338,338

[52] U.S. Cl. ............................ 85/77; 151/2 R
[51] Int. Cl. ................... F16b 13/10; F16b 39/02
[58] Field of Search ............ 85/77, 78, 72, 74, 73, 85/39, 37, 4, 7; 151/2 R

[56] References Cited
UNITED STATES PATENTS

| | | | |
|---|---|---|---|
| 2,385,886 | 10/1945 | Shaff | 85/78 |
| 2,405,897 | 8/1946 | Milone et al. | 151/2 R X |
| 3,073,205 | 1/1963 | Siebol | 85/78 |
| 3,421,562 | 1/1969 | Orloff et al. | 151/2 R |
| 3,443,474 | 5/1969 | Blakeley et al. | 85/74 X |
| 3,459,447 | 8/1969 | Hurd et al. | 151/2 R X |
| 3,643,544 | 2/1972 | Massa | 85/72 |
| 3,657,956 | 4/1972 | Bradley et al. | 85/72 |

Primary Examiner—Ramon S. Britts
Attorney, Agent, or Firm—Oblon, Fisher, Spivak, McClelland & Maier

[57] ABSTRACT

A fastener of the kind comprising a headed tubular body and a threaded bolt extending through the bore of the body has the head of the body provided with a hexagonal periphery and a flat upper surface formed with radial slots intercepting the bore of the body. The fastener is secured in the set condition by deforming a projecting portion of the bolt into the slots in the head of the body to prevent relative rotation between the bolt and the body.

1 Claim, 5 Drawing Figures

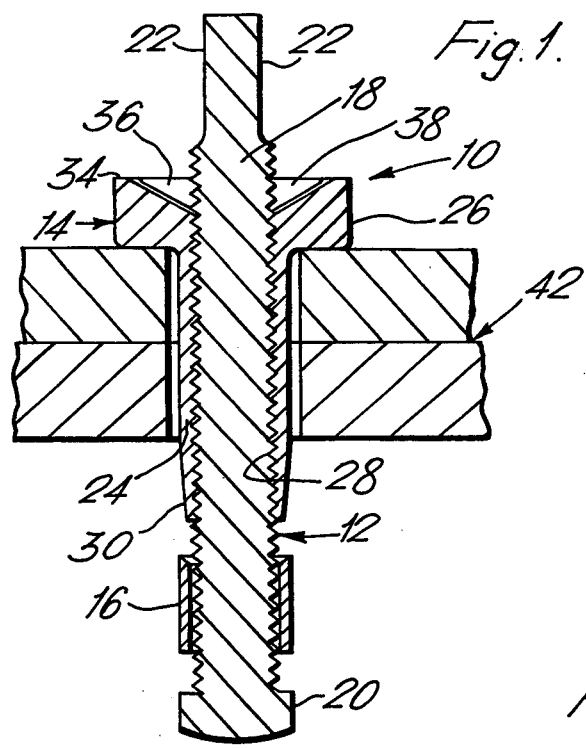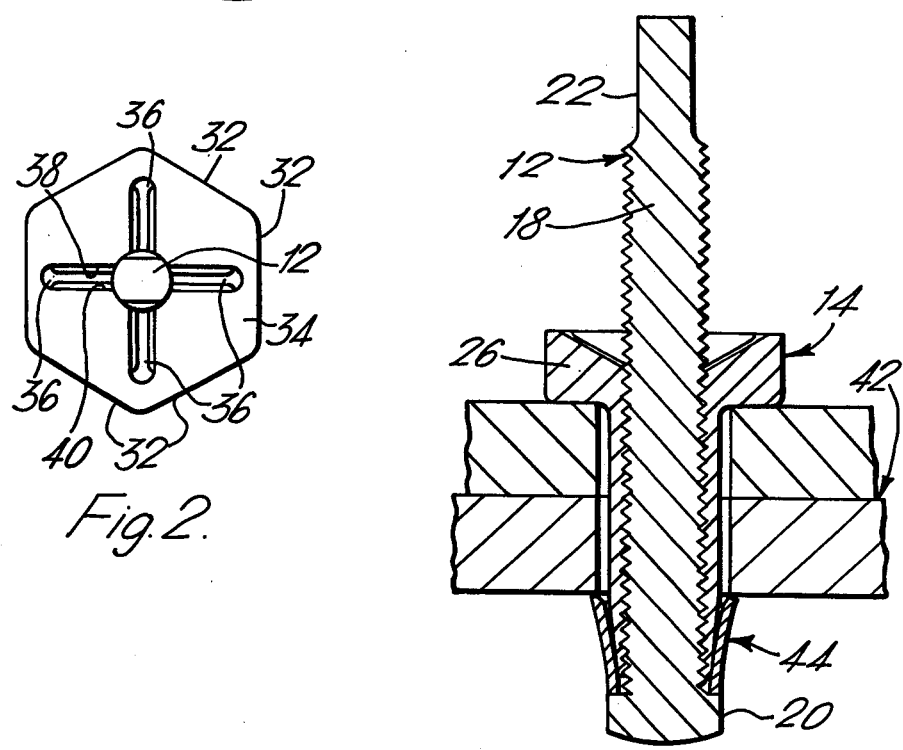

IMPROVED BLIND FASTENER

This invention relates to blind fasteners of the kind comprising a tubular body having a preformed head at one end thereof, and an externally threaded bolt which extends through the bore of the body and projects from the head thereof, which fastener may be set by rotating the bolt relative to the body to form a blind head at the end of the body remote from the preformed head. Such fasteners are hereinafter referred to as fasteners of the kind defined. The invention also relates to improvement in securing such fasteners to prevent rotation of the bolt relative to the body after the blind head has been formed.

It has been found that, with known fasteners of the kind defined, there is a possibility that, once the fastener has been set, under adverse conditions, the bolt may rotate relative to the body and thus permit the fastener to become insecure or loose.

We have now found that, using a suitably constructed fastener body, after the fastener has been set, the bolt can be deformed into locking engagement with the body so as to prevent it rotating relative to the body.

According to one aspect of the invention there is provided a fastener of the kind defined, in which fastener the head of the body has a non-circular peripheral surface and a substantially flat upper surface at the head end of the body, which upper surface is provided with at least one recess which presents at least one abutment surface, the abutment surface extending generally transversely of the head and longitudinally of the body and intersecting the bore of the body.

The fastener may be of the kind in which the bolt is threadedly engaged in the bore of the body so that rotation of the bolt relative to the body causes the bolt to move axially for the purpose of forming the blind head. The fastener may also be of the kind in which the bolt does not threadedly engage the body of the fastener, but in which an expandable sleeve is in threaded engagement with the bolt so that, on rotating the bolt, the sleeve is caused to move along the bolt and is deformed by the body to produce a blind head.

The recess may be in the form of a slot in the upper surface of the head of the body. There may be one or more such slots each providing an abutment surface. The or each such slot may extend radially outwardly across the upper surface of the head from the bore of the body.

According to another aspect of the invention, there is provided a fastener of the kind defined, in which fastener the upper surface of the head has at least one recess providing at least one abutment surface which extends generally transversly of the head and longitudinally of the body, which, after setting, may be secured by deforming a projecting portion of the bolt into abutment with at least one abutment surface of the head of the body.

The invention will now be described by way of example with reference to the accompanying diagrammatic drawings in which:

FIG. 1 is a sectional elevation of a fastener according to the invention;

FIG. 2 is a plan view of part of the fastener of FIG. 1;

FIG. 3 is a sectional elevation through the fastener of FIG. 1 in the set condition;

Figure 4:
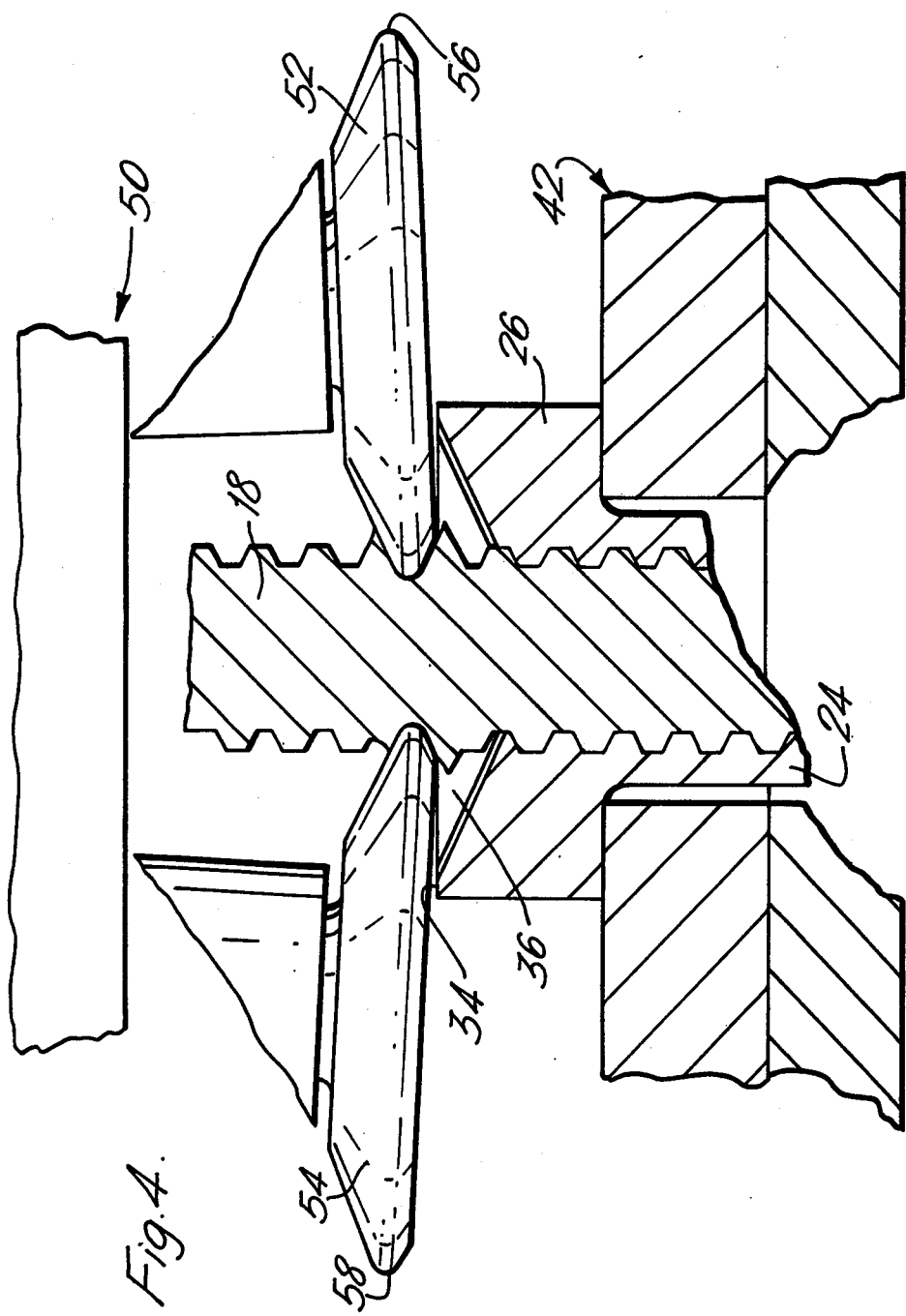
FIG. 4 is a fragmentary sectional elevation showing the fastener of FIG. 1 being secured in the set condition.
Figure 5:
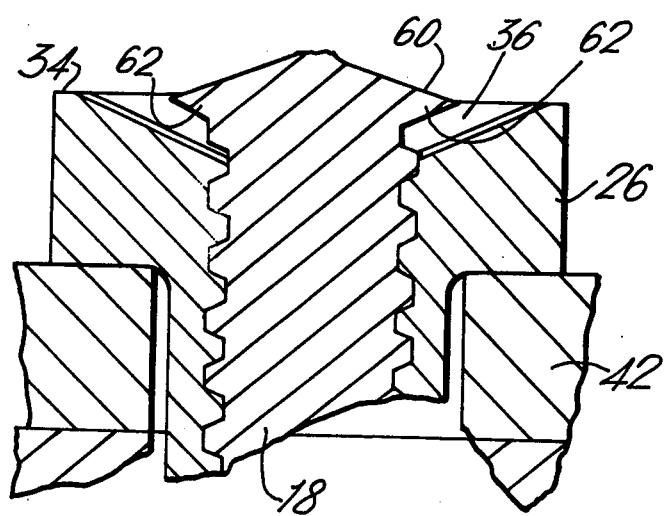
FIG. 5 is a fragmentary sectional elevation showing the fastener after the completion of the securing operation.

A fastener 10 comprises a bolt 12, a tubular body 14 and a tubular sleeve 16. The bolt 12 comprises an externally threaded shank 18 having a head 20 of the "raised" type at one end thereof. A portion of the bolt shank adjacent the end remote from the head 20 is provided with a pair of diametrically opposed flats 22 to facilitate engaging and rotating the bolt. The tubular body 14 comprises a shank 24 and a head 26 and has an internally threaded bore 28 extending axially through the head 26 and shank 24. The shank of the body has a conical portion 30 adjacent the end remote from the head 26 in which the diameter of the shank reduces away from the head. The shank 18 of the bolt extends through the bore of the body in threaded engagement therewith and the tubular sleeve 16 is disposed on the shank of the bolt between the bolt head 20 and the conical portion of the shank of the body. The end portion of the shank 18 of the bolt which has the flats 22 projects from the head end of the tubular body.

As shown in FIG. 2, the peripheral surface of the head 26 of the body is hexagonal, providing six flat wrenching surfaces 32. The upper surface 34 of the head 26 of the body (that is, the end surface remote from the shank 24) is generally flat and has four recesses 36 which extend radially outwardly from the bore of the body at right angles to each other. Each recess opens at the upper surface 34 of the head and provides two opposed abutment surfaces 38, 40 which extend radially outwardly from the bore of the body and, in the longitudinal direction of the body, into the head 26 to a depth of about 0.060 inches adjacent the bore, reducing towards the radially outer end of the recess.

In order, for example, to secure together two apertured sheet members forming a workpiece 42 the fastener is inserted, bolt head 20 first, through the aligned apertures of the workpiece until the head 26 of the body abuts the near face of the workpiece. The end portion of the shank 18 of the bolt which projects from the head end of the tubular body is then engaged by means of a suitable tool and rotated relative to the body, the body being simultaneously restrained from rotating by engaging the head 26 with a suitable tool, the flats 22 and the wrenching surfaces 32 facilitating suitable engagement of the bolt and body respectively. The bolt is rotated in a direction appropriate to cause the bolt to move outwardly of the head of the body, thus bringing the head of the bolt towards the body. The head of the bolt engages the sleeve and forces it over the conical portion 30 of the body so that the sleeve is radially expanded to form a blind head 44 on the remote side of the workpiece. Rotation of the bolt is continued until the workpiece is tightly gripped between the blind head and the head of the body, the fastener being then in the "set" condition. The portion of the bolt which projects from the head end of the body can then be removed. In order, however, to reduce or eliminate the possibility of the fastener becoming unfastened due to relative rotation between the body and the bolt after setting, the projecting portion of the bolt is deformed into one or more of the recesses 36 in the head of the body. In this way, the bolt is provided with means which actually does abut or at least is capable of abutting one or more of the abutment surfaces 38, 40 in one or more of the recesses 36. The operation of securing the fastener in the set condition can conveniently be carried out simultaneously with the removal of the projecting portion of the shank of the bolt.

FIG. 4 shows the operation in which by means of a tool 50, the projecting portion of the bolt shank 18 is simultaneously cropped off close to the head while the part of the bolt which is retained by the body of the fastener is deformed into one or more of the recesses 36 in the head 26.

The tool 50 is described in greater detail in our copending British Patent Application No. 39676/71 and comprises a pair of cutter wheels 52, 54 which are bevelled towards slightly radiussed peripheral cutting edges 56, 58. The cutter wheels are each mounted for rotation about their own axes and are movable towards each other to bring their cutting edges together forming a nip. The cutter wheels are also movable to orbit about the nip. In use, the tool 50 is applied to the projecting portion of the shank 18 of the bolt of a set fastener 10 so that the shank is aligned with the axis about which the wheels orbit. The tool is then operated to cause the cutter wheels to orbit about the shank and progressively to close upon the shank at a position as close as possible to the upper surface 34 of the head 26 of the body. As the wheels orbit around the shank 18 of the fastener, closing upon it, the cutting edges 56, 58 cut progressively into the shank. In cutting into the shank, the wheels displace metal of the shank axially thereof and the metal which is displaced towards the body 14 forms a flange 60 which abuts the upper surface 34 of the head 26. Furthermore, some of the displaced metal is forced into the recesses 36, forming lugs 62. Each lug 62 may actually be forced into abutment with both abutment surfaces 38, 40 of the recess which it enters, but even if it is not actually forced into such abutment, a very small amount of relative rotation between the bolt and the body will be sufficient to bring the lugs into abutment with an abutment surface in a recess so that further rotation will be resisted. Thus the fastener is effectively secured against such relative rotation between the bolt and the body as might allow the fastener to become loose.

The progressive cutting of the shank 18 by the tool is continued until the projecting portion of the shank separates from the part which is retained by the body. Due to the wedging effect of the bevelled cutter wheels, sufficient axial tension may be set up in the shank 18, to cause it to separate in the cutting plane before the cutting edges actually met together.

It will of course be appreciated that this mode of operation is applicable not only to the "raised" hexagonal headed fastener described with reference to FIGS. 1 to 3 but may also be used to secure other suitably constructed fasteners of the kind defined. For example, the head of the body of the fastener could be of the "countersunk" type, having a flat upper surface in which the recesses are formed to provide abutments. In such a case it would be necessary to make other arrangements for restraining rotation of the fastener body during setting and for this purpose the recesses could be used to accommodate means for restraining such rotation.

Obviously many modifications and variations of this invention are possible in light of these teachings. It is to be understood therefore, that within the scope of the appended claims, this invention may be practiced otherwise than as specifically described herein.

We claim:

1. A fastener comprising a bolt having an externally threaded shank, a bolt head at one end of the shank and diametrically opposed flats at the other end of the shank, a tubular body having a shank, an enlarged preformed head at one end of the shank and a threaded bore extending through the head and shank of the body, the head of the body having flat wrenching surfaces around its outer periphery and having a flat upper surface remote from the shank of the body, said upper surface having a plurality of circumferentially spaced recesses, each recess presenting two opposed abutment surfaces, each abutment surface intersecting and being contiguous with the bore and extending generally transversely of the head and longitudinally of the body, said bolt being threadedly engaged in the bore of the body and projecting from the ends of the body, the head of the bolt being disposed adjacent the shank, an expandable tubular sleeve disposed on the shank of the bolt between the head of the bolt and the shank of the body, the arrangement being such that by rotation of the bolt relative to the body, the tubular sleeve may be expanded to form a blind head and that after formation of the blind head the shank of the bolt is adapted to be deformed into one or more of said recesses whereby further rotation of the bolt relative to the body may be prevented.

* * * * *